(12) United States Patent
Perry

(10) Patent No.: US 11,105,881 B2
(45) Date of Patent: Aug. 31, 2021

(54) LEASH

(76) Inventor: Kevin Perry, Laurelton, NY (US)

( * ) Notice: Subject to any disclaimer, the term of this patent is extended or adjusted under 35 U.S.C. 154(b) by 427 days.

(21) Appl. No.: 13/395,059

(22) PCT Filed: Oct. 4, 2010

(86) PCT No.: PCT/US2010/051342
§ 371 (c)(1),
(2), (4) Date: Jun. 4, 2012

(87) PCT Pub. No.: WO2011/041786
PCT Pub. Date: Apr. 7, 2011

(65) Prior Publication Data
US 2012/0235826 A1 Sep. 20, 2012

Related U.S. Application Data

(60) Provisional application No. 61/248,214, filed on Oct. 2, 2009.

(51) Int. Cl.
*G01S 1/68* (2006.01)
*G08B 21/24* (2006.01)
(Continued)

(52) U.S. Cl.
CPC .............. *G01S 1/68* (2013.01); *G01S 5/0226* (2013.01); *G08B 13/1427* (2013.01);
(Continued)

(58) Field of Classification Search
CPC ....... H01Q 1/22; G08B 13/1427; G06Q 10/08
(Continued)

(56) References Cited

U.S. PATENT DOCUMENTS 4,419,770 A * 12/1983 Yagi et al. .................... 455/301
5,223,815 A    6/1993 Rosenthal et al.
(Continued)

FOREIGN PATENT DOCUMENTS

JP   H08-273070 A   10/1996
JP   H10-334366 A   12/1998
(Continued)

OTHER PUBLICATIONS

Japanese Office Action, dated Sep. 2, 2014, issued in corresponding Japanese Patent Application No. 2012-532137.
(Continued)

*Primary Examiner* — Jack K Wang
(74) *Attorney, Agent, or Firm* — Arent Fox LLP

(57) ABSTRACT

An apparatus and method for tracking an object includes a transmitter that generates a signal and a receiver that receives the signal generated by the transmitter. The receiver generates an alert signal when a distance between the transmitter and receiver is greater than a predetermined value. The receiver is retained in a retaining element, such as a wrist band, while the transmitter is secured to an object. The receiver is programmable to generate the alert signal only when the predetermined distance has been exceeded. The retaining element optionally includes multiple retaining features so that multiple receivers may be retained in a single retaining element. Each receiver is programmable to communicate only with one corresponding transmitter by assigning each transmitter/receiver pair with a unique identification code. The unique identification code expires after use so that each transmitter may only communicate with a single receiver.

14 Claims, 3 Drawing Sheets

(51) Int. Cl.
*G08B 21/02* (2006.01)
*G08B 13/14* (2006.01)
*G01S 5/02* (2010.01)

(52) U.S. Cl.
CPC ..... *G08B 21/0227* (2013.01); *G08B 21/0247* (2013.01); *G08B 21/0252* (2013.01); *G08B 21/0266* (2013.01); *G08B 21/24* (2013.01)

(58) Field of Classification Search
USPC ....... 340/7.22, 573.1, 539.32, 686.6, 539.22, 340/539.13, 539.11, 568.7; 709/221; 455/561, 300; 700/259; 713/202; 235/385, 378
See application file for complete search history.

(56) References Cited

U.S. PATENT DOCUMENTS

| | | | | |
|---|---|---|---|---|
| 5,228,449 | A * | 7/1993 | Christ et al. | 600/504 |
| 5,280,646 | A * | 1/1994 | Koyama et al. | 455/300 |
| 5,677,673 | A | 10/1997 | Kipnis | |
| 6,313,733 | B1 * | 11/2001 | Kyte | 340/7.22 |
| 6,571,299 | B1 * | 5/2003 | Schroyer et al. | 710/6 |
| 8,508,363 | B2 * | 8/2013 | Raniere | 340/539.32 |
| 2002/0036569 | A1 * | 3/2002 | Martin | 340/573.1 |
| 2002/0084904 | A1 * | 7/2002 | De La Huerga | 340/573.1 |
| 2002/0113705 | A1 * | 8/2002 | Wallace | G08B 13/1427 340/568.7 |
| 2002/0190861 | A1 * | 12/2002 | Wentworth | G08B 21/0263 340/568.1 |
| 2004/0046658 | A1 * | 3/2004 | Turner et al. | 340/539.11 |
| 2004/0095246 | A1 * | 5/2004 | Valletta | 340/573.1 |
| 2004/0121756 | A1 * | 6/2004 | Griffin | G01S 19/17 455/404.2 |
| 2005/0055582 | A1 * | 3/2005 | Bazakos et al. | 713/202 |
| 2005/0088304 | A1 * | 4/2005 | Hines et al. | 340/572.1 |
| 2005/0113978 | A1 * | 5/2005 | Sharma et al. | 700/259 |
| 2005/0148339 | A1 * | 7/2005 | Boman | G08B 13/1427 455/456.1 |
| 2005/0193103 | A1 * | 9/2005 | Drabik | 709/221 |
| 2006/0176178 | A1 * | 8/2006 | Everest | G08B 21/0202 340/572.1 |
| 2007/0052534 | A1 * | 3/2007 | Bird et al. | 340/539.13 |
| 2007/0096933 | A1 * | 5/2007 | Enitan et al. | 340/686.6 |
| 2007/0260421 | A1 * | 11/2007 | Berner, Jr. | A43B 13/00 702/160 |
| 2007/0273506 | A1 * | 11/2007 | Butler | G04G 13/021 340/539.18 |
| 2008/0001735 | A1 * | 1/2008 | Tran | 340/539.22 |
| 2008/0039141 | A1 * | 2/2008 | Claussen et al. | 455/561 |
| 2009/0206154 | A1 * | 8/2009 | Pietrzyk et al. | 235/375 |
| 2009/0306485 | A1 * | 12/2009 | Bell | A61B 5/282 600/301 |
| 2009/0328189 | A1 * | 12/2009 | Budyta et al. | 726/14 |
| 2010/0252626 | A1 * | 10/2010 | Elizondo et al. | 235/385 |
| 2012/0253485 | A1 * | 10/2012 | Weast | A63B 24/0059 700/91 |

FOREIGN PATENT DOCUMENTS

| | | |
|---|---|---|
| JP | 3062469 U | 7/1999 |
| JP | H11-242790 A | 9/1999 |
| JP | S59-3597 A | 9/1999 |
| JP | 2002-319075 A | 10/2002 |
| JP | 2004-240857 A | 8/2004 |
| JP | 2004-287713 A | 10/2004 |
| JP | 2006-15832 A | 1/2006 |
| JP | 2009-217629 A | 9/2009 |
| KR | 20-0166385 Y1 | 2/2000 |
| KR | 10-0353081 B1 | 9/2002 |
| KR | 10-2003-0055708 A | 7/2003 |
| KR | 10-0526361 B1 | 11/2005 |

OTHER PUBLICATIONS

Japanese Office Action dated Mar. 10, 2015 for corresponding Japanese Patent Application No. 2012-532137.
Office Action of Canadian Patent Application No. 2,788,808 dated Mar. 21, 2016.

* cited by examiner

LEASH

CROSS-REFERENCE TO RELATED APPLICATIONS

This application is a National Stage entry of International Application No. PCT/US2010/051342, filed Oct. 4, 2010, which claims priority to U.S. Provisional Application No. 61/248,214, which was filed on Oct. 2, 2009, the entirety of which is hereby incorporated by reference.

Everyone loses things from time to time, and for various reasons. This can be due to distractions, rushing between appointments and/or errands; too many things on their minds; or juggling numerous tasks (e.g., multitasking) at once.

With the prevalence of incidents of this nature occurring regularly, e.g., lost keys, cellular telephones, personal digital assistants (PDAs), musical instruments, iPods, wallets, cameras; and yes even laptop computers, devices in accordance with aspects of the present invention become particularly valuable. As further evidence of this value, it is noted that many urban transportation agencies have warehouses devoted to lost items that people leave behind on buses and trains; not to mention airports.

One additional use that is important with regard to the problems solved by devices in accordance with the aspects of the present invention: these days, many common carriers and delivery companies metropolitan transit agencies entrust many of their employees with various handheld devices. For instance, in the case of delivery companies, these devices are used to register deliveries, bar code reading and for recipient signatures. For example, government agencies use a device to read registrations on vehicles to issue summonses, and even police departments could benefit from such a device. The last thing an officer would like to lose is a service revolver. Thus far, all of the above descriptions relate to items no one can afford to lose. Notwithstanding the fact that some of these items e.g., portable media players, cellular telephones, wireless communicating cameras, etc. are expensive, they can, however, generally be replaced with minimum anguish. Other items are, in some instances, irreplaceable. This may especially be true of a laptop because, in addition to the severe anguish due to its costs, even more valuable, the files/data and important information it contains—be it business, personal or otherwise—may be irreplaceable.

SUMMARY OF THE INVENTION

Aspects of the present invention include: (1) a signaling clip or transmitter device securable to an item to be tracked or otherwise secured; and (2) a system or "kit" for programming having a receiver or otherwise uniquely associating the signaling device with monitoring features (e.g., a wristband) retained by the user.

In some variations, the system or kit may include: (1) a compact disc (CO), downloadable software, and/or other loadable and operable software to be used with an external device for assisting with programming, selection, or other activities associated with operation of various components; (2) a user associated signal recovery or other monitoring device (e.g., a wristband wearable by the user that is programmable and/or otherwise associated with the signaling device; (3) a cable or other coupling feature (e.g., wired, wireless, or fiber optic features) for communicating information among components; and (4) a selection mechanism (e.g., a stylus) usable with the user associated signal recovery device for selecting features and/or otherwise controlling operations relating thereto.

Additional advantages and novel features relating to variations of the present invention will be set forth in part in the description that follows, and in part will become more apparent to those skilled in the art upon examination of the following or upon learning by practice of aspects thereof.

BRIEF DESCRIPTION OF THE DRAWINGS

The present invention will become fully understood from the detailed description given herein below and the accompanying drawings, which are given by way of illustration and example only and thus not limited with respect to aspects of the present invention, wherein.

DETAILED DESCRIPTION

Figure 1:
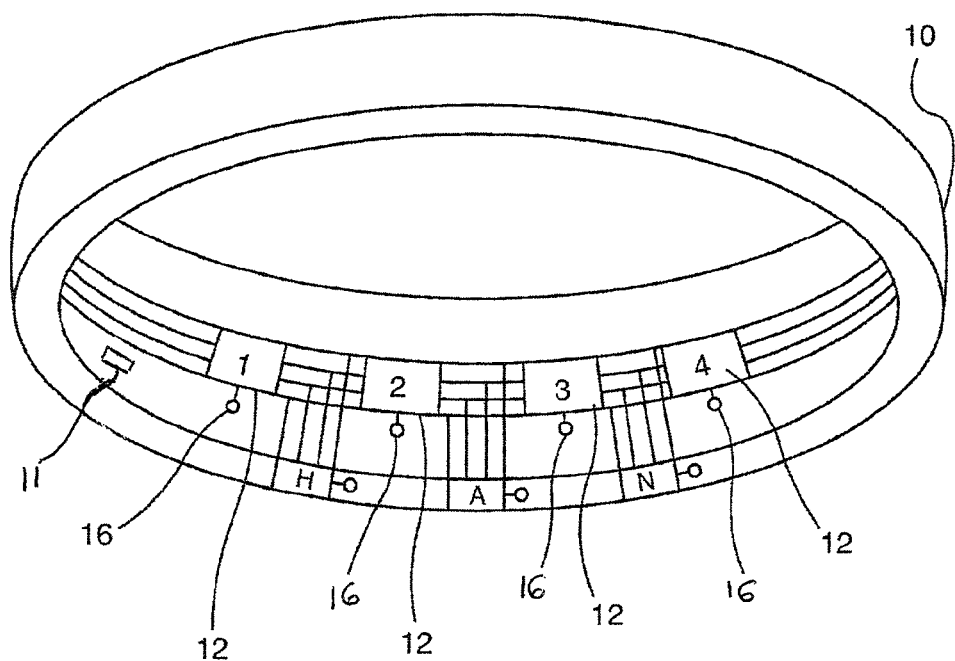
FIG. 1 is a schematic diagram of an exemplary aspect of the invention.

One exemplary implantation referred to herein as the "Proximity Leash" which is accurate for at least two reasons: (1) an accurate designation of what the device does; and (2) it allows its user to keep valuable items within close range as the device constantly monitors that item, thereby freeing the user so that the user can be occupied with other things, without the worry of leaving anything behind.

Among other things, devices in accordance with aspects of the present invention allow users to keep tract of personal items without the concern of losing them due to distraction, pilfering, mental lapses, etc. Also, such devices ensure that the tracked device never is more than a short distance away from the user without the user's notice. Yet, in safer environments, such as home or office, the device can be programmed to allow a greater distance between the user and device, and, of course, when not needed, switched off to preserve battery life.

In one exemplary implementation, the system for use in conjunction with the alert device includes five core implementation components: (1) a wrist band/bracelet 10 or necklace having a receiver 12, or other user associated signal device for securing the item to be tracked; (2) circuit board/chip(s), or other transmitter signaling device (not shown), (3) programming (CD) or other data implementation features 918; (4) a (USB) board; or other portable programming/storage device; and (5) a stylus 20 or other selection device for selectively setting components. Each component and its operation ("the Kit") will now be described.

The CD or other portable programming or storage device 918 is the brain or programming vehicle for the system. Using a personal computer 900 for example, after the CD is inserted into the computer, a menu (very user friendly) will appear after a disclaimer/license agreement is supplied for approval by the user. The menu will provide the user with an access ID for each kit (means: to use this CD or other programmable storage device in the future, access will be granted only after inserting or typing in a pin number or otherwise providing security information). This security feature ensures that each kit is individual and (proximity leash) unique. Additionally, this approach will make certain that, as each item is "tagged" ("tagged" as used herein refers to when an item, e.g., laptop, iPod, cellular telephone, etc. is protected by the device), and that no two devices can be cross identified. For example, if two users are in the same taxi and both are using the leash, only the items personally tagged by each individual will respond. Of course, the chip/circuit board or other processing device (discussed later) will also help guarantee uniqueness. Furthermore, the CD or other programming/storage device will allow the user to label each chip/circuit board or other processing device associated with the item being tagged. Information such as type of item, make, model, and serial number may be registered on each chip/circuit board and stored on a CD, for example, As a vehicle to obtain the above, the user may be prompted with a series of queries and/or have drop down menus or other input mechanisms for responding to the queries. The CD, for example, may allow for programming up to four (4) items.

If the user wants to protect more items than the CD will accommodate, for example, the user will need additional kits.

The CD for example, will allow programming of each chip/circuit board numerically 12. For example, each kit may come with four individual programmable chips/circuit boards already uniquely numbered. After each chip/circuit board is programmed, the corresponding chip 12 in the wristband 10 associated with that chip/circuit board will need to be programmed before moving on to the next chip/circuit board. In other words, for example, to minimize error, the programming of each chip/circuit board may be part of a cycle to be completed before the program will allow tagging the next item.

At any rate, the menu will prompt the user on how to proceed. Due to the fact that in some variations, once programmed and applied, the chip cannot be removed without damage to the chip (discussed further below), it may be critical that all steps are followed as outlined in the owner's manual. Once programmed, on some variations, the chip cannot be reprogrammed or erased, it can only be accessed via the USB, in a read-only format. During the programming process, feedback may be provided relative to the progress such as, in percentages; e.g., 20%, 50%, 80%, etc. Upon completion, the program will advise the user that it is "ok to disconnect" the chip or wristband and proceed to the next step.

As part of the final stages to the programming process, the CD, for example, will allow the user to set the proximity ranges for the settings on the wristband. A first pair of settings, referred to herein as the "H." and "A." settings, may be preprogrammed, meaning all settings/ranges will be consistent in any wristband; e.g. H="Home" will always mean the device is off and not monitoring. A="Alert" will occur for movement beyond a preset distance (e.g., 12", 30.48 cm); A third setting referred to herein as the N="Normal" setting, will allow the individualized user to set a range from 20 feet (6.096 m) to 1000 feet (304.8 m) (e.g., for the times when the user leaves the tagged device in an office to attend a meeting, for example, or to use the restroom, and the user wants to ensure the tagged device does not leave the building or is taken too far without the user's notice). This setting may be appropriate, for example, for a semi-safe environment.

In some variations, anytime the CD is inserted, it will update the user as to how many chips/circuit boards have been programmed and how many are left to be programmed (or if there are any programmed). It will list the items tagged, with date/time. If additional chips/boards are available, the user may be prompted as to whether the user would now like to begin additional programming (e.g., chip #2) remaining chips/boards. (Yes/No.) If yes is selected, for example, the process mentioned at the outset will begin with the next circuit board in the sequence being programmed and be able to continue until up to all (4) chips/boards and wristband are programmed. The user may not receive a "finish" prompt until each cycle is completed, meaning: chip and wristband are ready for use. A cycle may be defined as completing the programming of an individual chip/circuit board and wristband; specifically, the corresponding numerical hold on the inner-side of the wristband that matches the numbered chip/circuit board 12 which are numbered one through four (1-4). In some variations, programming may only be completed in the proper sequence, although the sequence may not necessarily have to be completed in a single session. The chip/circuit board 12 and the wristband 10 in each numerical sequence may be assigned a special code or ID, (made up of numbers, letters, symbols or a combination of each). Once the code is used twice, once for the chip/circuit board 12 and once for the corresponding numbered recessed hole on the wristband, for example, that code may expire, meaning it cannot be used for any other numerical sequence (even on the same wristband) and especially with a different kit. This approach may be used for example, to guarantee uniqueness. The code is thereby permanently married to that chip, and its numerical counterpart to the wristband, for example. A new code will be assigned to the next sequence, beginning with chip no. 2, and each cycle will mimic the first until all four are completed.

1. The USB or Other Wired, Wireless, or Fiber Optic Communication Feature.

The purpose of this feature is to communicate data, with, for example, the CD to the chip/circuit boards) and wristband. The larger end of the USB, for example, will plug into the PC being used with the CD or other source of software to prepare and initiate download. A single wire 18 that attaches to the chip and wristband, for example, may be used which provides a micro-USB with four to six pins (4-6 active pipes). The pins (pipes), for example, may mate with a female (host) end of the chip/circuit board and wristband, enabling communication/programming. The communication between the CD and the device in some variations may be uni-directional, meaning there will be a transfer of data/instructions from the source (the CD), the chip/wristband, only, for example. When the USB device is connected to the USB host (chip or wristband), after being prompted, the USB enumeration process is started. The enumeration process may first send a test signal to the device. After the reset USB device setup information is read by the CD program; or computer source; and a special code (mentioned earlier) or address is assigned, which may consist, for example, of 4-7 characters. The unique device drivers needed for communicating with the device are loaded, to the conduit which is the USB; and the device is set to a configured state. The program generated code will ensure that each circuit board only responds to one wristband, and that wristband cannot respond to any circuit board that is not part of the original kit. So, under no circumstances, in such variations, will a wristband pick up a signal from a foreign chip/circuit board.

As discussed above, each circuit board 12 is programmed, a red light may illuminate or other indicator occur, until the process is complete. Other indicators may include additional corresponding lights on the wristband described further below. When complete, a green indicator may illuminate, for example, which will mean that the circuit board and wristband are linked and tagged for one (1) item. This process may be repeated via USB until all board and wristband is programmed and in sync. The USB and cable, for example, may also provide for a further programming of the wristband/bracelet, allowing different types of alerts, such as musical, voice, sounds and even customized indicators.

2. Transmitter/Chip/Circuit Board

This feature will be coupled for programming via the USB or other suitable wire, wireless, or fiber optic coupling. Each chip will have a female host to accommodate a micro-USB, for example, with corresponding pins/pipes to facilitate communication. Each kit may contain a predetermined number of chips/circuit board(s). For example, the chips may be flat and vary in size, depending on the device to be tagged. The reason that the circuit board may vary in size is to accommodate various items, even as small as a cellular telephone or an iPod, Nano or even a Bluetooth device. A circuit board could even be attached to a key, a fob or tag on a key ring, for example.

A portion (e.g. from the bottom side) of the circuit board may have a permanent adhesive or other attachment feature that, once attached, can only be removed by scraping off and cannot be reattached, which may also be designed to set off the alert in this event. The top side of the board may have a protective feature, such as a clear plastic coating, that will protect the board and allow for the board to be against another object or a flat surface and not be affected. In addition, the protective feature may help the board to be impervious to temperatures, ranging from cold to moderately hot and to be shock resistant. The board will also be sensitive to pick-up signals from the wristband/bracelet. The circuit board may include features to allow it to give proximity alerts, based on the distance of the object it is attached to from the programmable wristband/bracelet. The transmitter may generate a signal, for example, having a variable signal strength, the signal strength decreasing as it travels away from the transmitter. Thus, a particular distance between the transmitter and the receiver can be determined based on the strength of the signal received by the receiver. However, it is within the scope of the invention that any suitable positioning determining methods may be implemented. For example, a global position system (GPS) may be used.

The wristband 10 or other monitoring alert provides another main component of the overall system. It serves as the monitor of the proximity of the valued items to the user. The monitoring element may comprise a lightweight metal (e.g., alloy) with relatively small elasticity and either thick enough to house a series of chips or to which chips may be attached. Any metal or wire elements, may for example, be housed or coated in a rubber jacket as appropriate, such as to enable the element to be worn as a wristband.

3. Receiver/Wristband

The wristband 10 or other monitoring element may be fashioned after those popular bands in various colors that people wear, such as to support cures for cancer, etc. The element may be sized and colored appropriately to correspond to various charities, and a portion of the proceeds may, for example, go to those charities. Most such wristbands are made of rubber, although leather and other materials are also used. The designs and colors can suitably be related and can even be customized, including being fashioned in fine jewelry for special occasions.

For a measure of security, if fashioned as the wristband the element may be closed ended. (The user will have to slip the hand through) as opposed to open-ended which can come off or subtly be taken off.

The element may not be waterproof, and in this event, must be treated like a watch (e.g., should be removed when swimming or if there is a chance that it could be submerged in water). A waterproof sleeve may also be provided, so that it is not affected by sweat and small amounts of water, such as when one is involved in athletic activity. The band may be designed so as not to be stretchable too much beyond its intended circumference, just enough to allow the user to put on or take off, while also not compromising its internal wiring.

One outstanding feature of such a wristband is its functionality and usefulness. In the wristband or other element, as discussed above, will be a programmable receiver chip 12 that will allow its owner to link up to four items via the circuit board and wristband.

Figure 2:
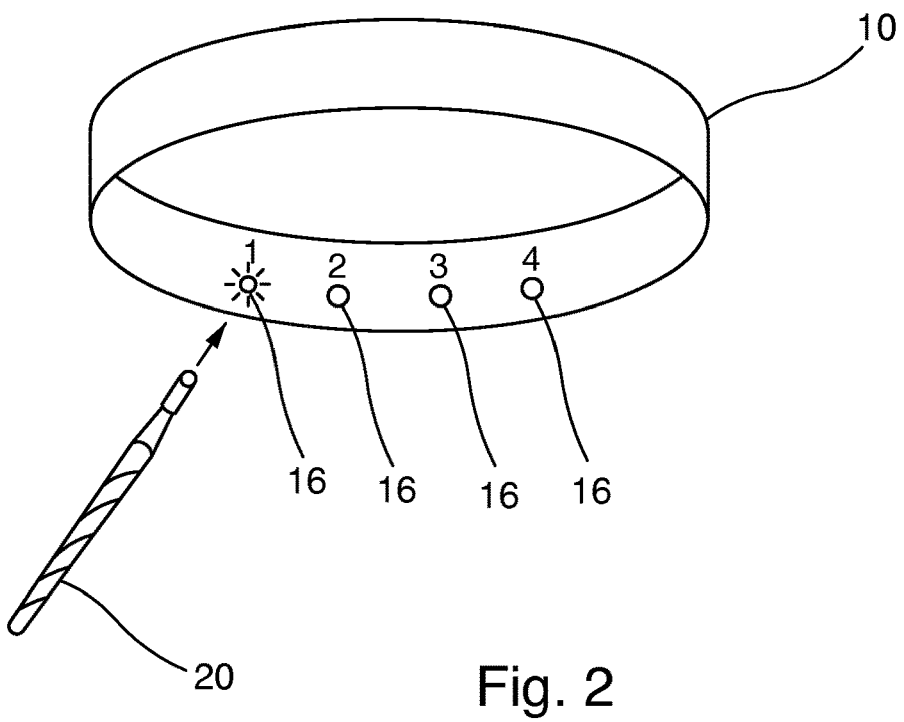
FIG. 2 is a perspective view of an exemplary aspect of the invention.
Figure 3:
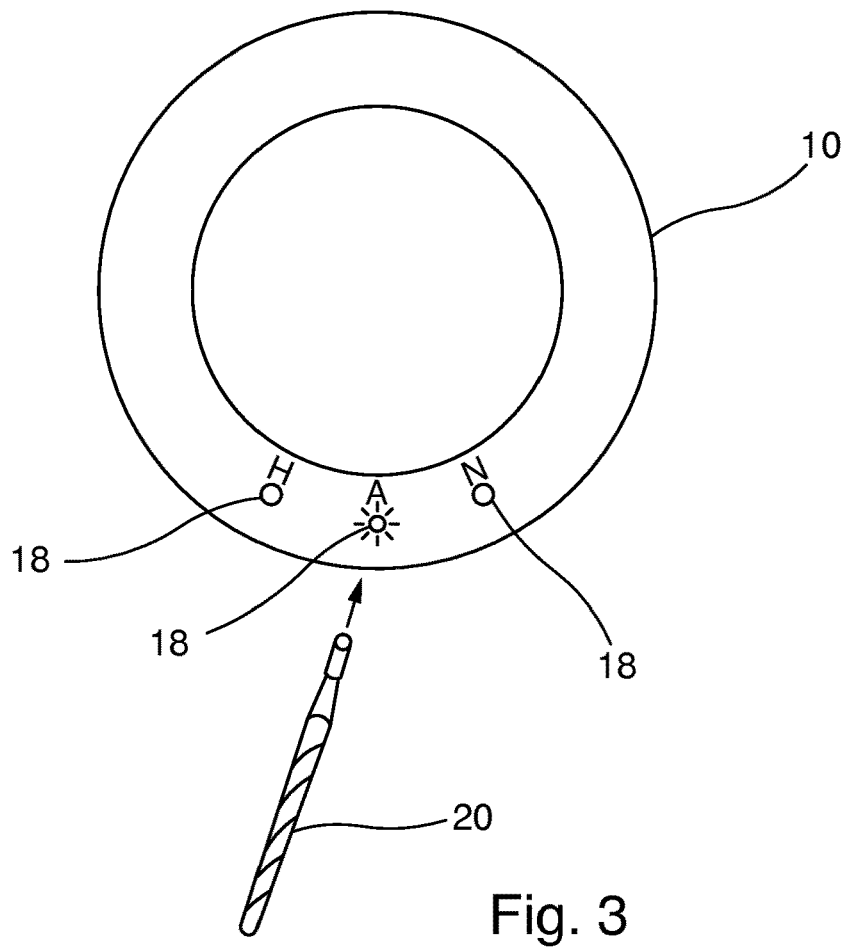
FIG. 3 is a bottom view of the exemplary aspect of FIG. 2.

As shown in FIGS. 1-3, similar to the chip, the wristband or other receiving element will have a female counterpart 11 to host or accommodate the USB that will be the vehicle for the receiving element to communicate with the CD/program component. The inner-side (exterior) of the band may have numbers (e.g., one to four (1-4) or other indicators on it (etched or engraved, not embossed) with each separated, such as by approximately ⅛ of an inch. Under each number may be an input feature 16, such as a recessed hole (the recessed hole is to prevent accidental activation or deactivation), housing a small LED light that when touched or pressed lightly via the stylus will illuminate to activate and begin the initial stages of monitoring. On the bottom edge of the band, for example may be the letters H. A. N. (pronounced hand), each also separated (e.g., by ⅛ of an inch), next to each of which will be small recessed hole 18 (as shown in FIG. 3) that will also illuminate when touched or pressed lightly using the stylus 20. This feature relates to the second step in the activation process. For example, the device may be designed such that, if not activated in the appropriate sequence and this light is activated first before the number on the inside of the band, it will just blink twice and go out. Only when correctly performed in conjunction with one of the numbered holes on the inner-side, will the activation be properly initialized. Once the numerical hole and the lettered hold is activated (again in that order), for example, the receiving element will signal/or otherwise communicate to the chip/circuit board that corresponds with the initialized number on the band that monitoring has begun and the tagged item is being monitored by the proximity alert. The wristband 10 or other receiving element may be capable of monitoring up to four items at once, for example, due to the unique wiring and chips on the band and on the tagged item, to minimize the chance of cross monitoring.

Once the circuit board and wristband has been programmed and linked, each item may be put on a proximity alert. In other words, while wearing the band, the user can program the distance that, for example, a laptop can be from the user before an audible/vibrating alert will sound. As mentioned above, the user may be able to customize the alert from a simple beeping noise to a musical tone. The wristband may be available in various sizes (circumferences) and is intended to fit loosely like a bracelet/bangle. Due to the chip inside, this element may need to be a certain thickness and width, but not bulky. In some variations, the outer side of the band will give no indication that it is a monitor; it will look like it is just a "wristband" or a piece of jewelry.

The alert signal may be generated, for example, by the receiver when the variable signal strength provided by the transmitter falls below the signal strength that corresponds with the predetermined distance between the transmitter and the receiver. In other words, a particular signal strength is received by the receiver when the transmitter is at a particular distance away from the receiver. As long as the signal generated by the transmitter is equal to or stronger than the expected signal strength at the particular distance, the receiver will not generate an alert signal. However, once the signal strength generated by the transmitter is weaker than the expected signal strength for the particular distance, the receiver will generate the alert signal.

4. Stylus

The Stylus 20, or other selection feature may be, for example, similar to most styluses, the difference being that it may have a rubber coated tip small enough to fit inside of the recessed holes 16,18 on the wristband, for example, yet the reverse graduated thickness of the stylus will be so that no more pressure than necessary can be put on the LED button, so as to avoid damage. Some portion (e.g., three-quarters) of the stylus from the top down may be fashioned like a pen, for example, even having (and in some cases) ergonomic feel for comfort ability, with a clip so that it is portable. Each kit may have two (2) styluses.

In one exemplary mode of operation, when the stylus 20 is placed into hole No. 1 for example, and held for a predetermined time (e.g., 2 seconds) the corresponding light will become a steady red, indicating that it is ready for programming. Once the light goes steady red (e.g., after 2 seconds) the stylus is taken out and put in one of 3 holes on the bottom edge of the band identified by 1 of 3 letters (H) home; (A) alert (N) normal. If it is placed in the hole next to the "H" in the bottom edge then the chip/circuit board attached to the valued item will be programmed for Home.

On the other end of the spectrum, if after putting the stylus in hole no. 1, as discussed above, and then the stylus is put in the hole next to the letter "A," which means high alert, then just the opposite of home status will happen.

The alert status means that it the wristband and the linked item are more than a short distance (e.g., a foot) away from each other, upon which an audible and vibrating alert, for example, may initiate.

So, if the user is in a taxi and attempts to exit without the valued item, the alarm may sound as soon as the user is a foot or more away, which should allow the user to retrieve the item before the taxi pulls away. Of course on a bus, train, or in an airport with the device, the user will be even less likely to lose, leave, or have the item slipped away from them, by even the professional who is an expert at slight of hand. Once the item is retrieved (or is back in the programmed range) the alert will silence, but will stay in alert status (until reprogrammed).

As with any of the status levels (H.A.N.), the corresponding lights 1-4 will flash as the alarm sounds to indicate which item was left behind. If more than one item is programmed and left behind then there may be a pause, for example, anywhere from 2-4 seconds between the sounding of each alert.

Finally the (N) Normal status represents that the item is in an environment that is not as safe as home, yet not as sensitive or vulnerable as Alert. In the Normal (semi-safe) status, an item can be anywhere from 20 feet away to a thousand feet, for example, depending on how the user has programmed it when first initiating the band with the CD. This step is important and will vary according to the individual user's preference.

For instance, if the user works in an office building with many floors and the user wants to leave an item in an office while in the restroom, go to a meeting, etc. the alarm will not sound.

Figure 4:
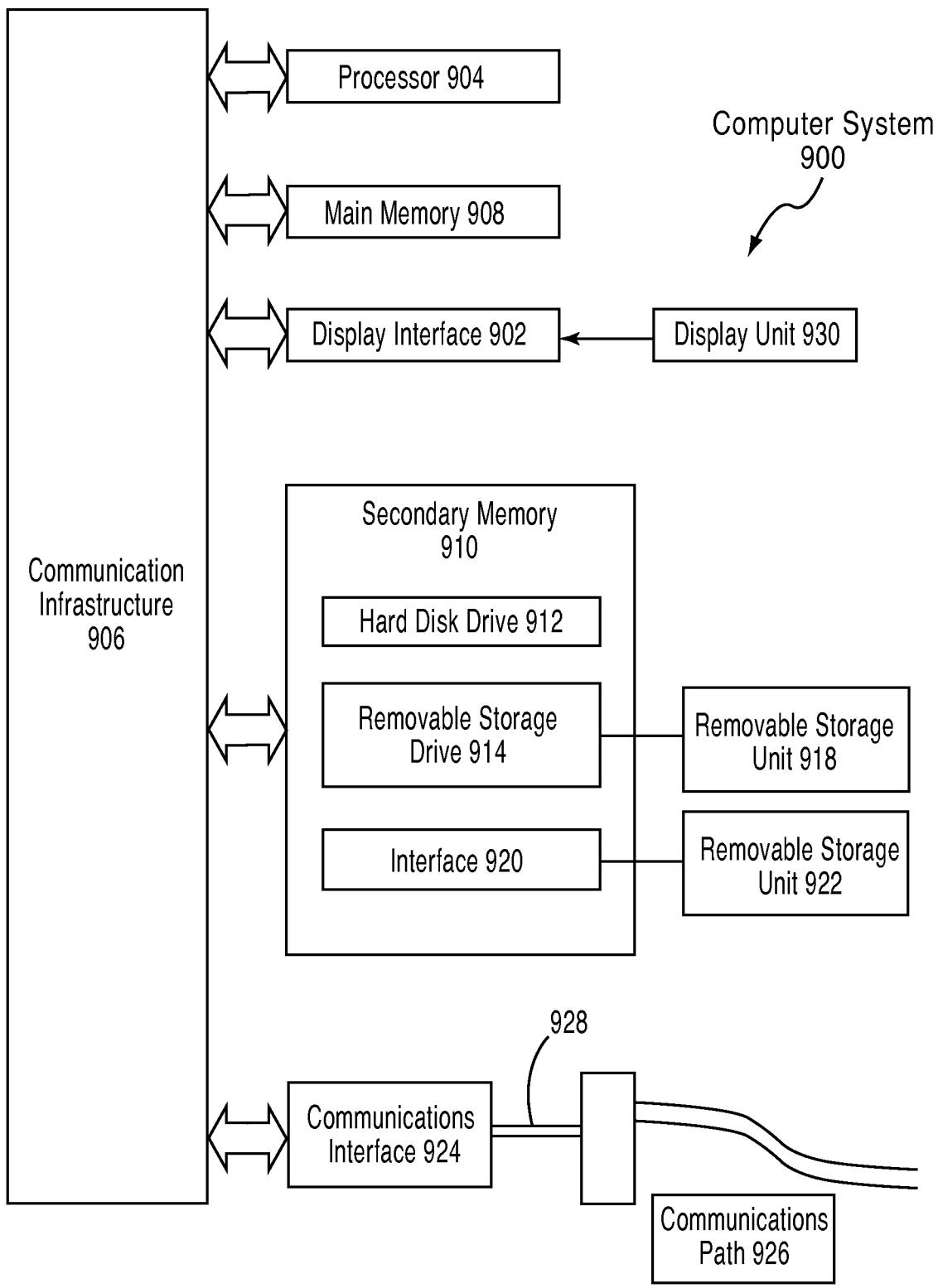
FIG. 4 is a computer system with which aspects of the present may be implemented.

However, if someone attempts to take the item out of the office building or just further than the user programmed (distance greater than the pre-set range), the alarm will sound. At that point, if the user has a tracking device (e.g., GPS on a laptop) it would be good to engage it. Usually a situation like the one just described should be rare, but on occasion, might be necessary 5. External Device Usable with Aspects of the Present Invention Aspects of the present invention may be implemented in conjunction with using hardware, software, or a combination thereof and may be implemented in one or more computer systems or other processing systems. In one variation, aspects of the invention are directed toward one or more computer systems capable of carrying out the functionality described herein. An example of such a computer system 900 is shown in FIG. 4. Computer system 900 includes one or more processors, such as processor 904. The processor 904 is connected to a communication infrastructure 906 (e.g., a communications bus, cross-over bar, or network). Various software aspects are described in terms of this exemplary computer system. After reading this description, it will become apparent to a person skilled in the relevant art(s) how to implement aspects of the invention using other computer systems and/or architectures.

Computer system 900 can include a display interface 902 that forwards graphics, text, and other data from the communication infrastructure 906 (or from a frame buffer not shown) for display on a display unit 930. Computer system 900 also includes a main memory 908, preferably random access memory (RAM), and may also include a secondary memory 910. The secondary memory 910 may include, for example, a hard disk drive 912 and/or a removable storage drive 914, representing a floppy disk drive, a magnetic tape drive, an optical disk drive, etc. The removable storage drive 914 reads from and/or writes to a removable storage unit 918 in a well-known manner. Removable storage unit 918, represents a floppy disk, magnetic tape, optical disk, etc., which is read by and written to removable storage drive 914. As will be appreciated, the removable storage unit 918 includes a computer usable storage medium having stored therein computer software and/or data.

In alternative variations, secondary memory 910 may include other similar devices for allowing computer programs or other instructions to be loaded into computer system 900. Such devices may include, for example, a removable storage unit 922 and an interface 920. Examples of such may include a program cartridge and cartridge interface (such as that found in video game devices), a removable memory chip (such as an erasable programmable read only memory (EPROM), or programmable read only memory (PROM)) and associated socket, and other removable storage units 922 and interfaces 920, which allow software and data to be transferred from the removable storage unit 922 to computer system 900.

Computer system 900 may also include a communications interface 924. Communications interface 924 allows software and data to be transferred between computer system 900 and external devices. Examples of communications interface 924 may include a modem, a network interface (such as an Ethernet card), a communications port, a Personal Computer Memory Card International Association (PCMCIA) slot and card, etc. Software and data transferred via communications interface 924 are in the form of signals 928, which may be electronic, electromagnetic, optical or other signals capable of being received by communications interface 924. These signals 928 are provided to communications interface 924 via a communications path (e.g., channel) 926. This path 926 carries signals 928 and may be implemented using wire or cable, fiber optics, a telephone line, a cellular link, a radio frequency (RF) link and/or other communications channels. In this document, the terms "computer program medium" and "computer usable medium" are used to refer generally to media such as a removable storage drive 980, a hard disk installed in hard disk drive 970, and signals 928. These computer program products provide software to the computer system 900. The invention is directed to such computer program products.

Computer programs (also referred to as computer control logic) are stored in main memory 908 and/or secondary memory 910, for example. Computer programs may also be received via communications interface 924. Such computer programs, when executed, enable the computer system 900 to perform various features in accordance with aspects of the present invention, as discussed herein. In particular, the computer programs, when executed, enable the processor 910 to perform such features Accordingly, such computer programs represent controllers of the computer system 900.

In variations where aspects of the invention are implemented using software, the software may be stored in a computer program product and loaded into computer system 900 using removable storage drive 914, hard drive 912, or communications interface 920. The control logic (software), when executed by the processor 904, causes the processor 904 to perform the functions of the invention as described herein. In another variation, aspects of the invention is implemented primarily in hardware using, for example, hardware components, such as application specific integrated circuits (ASICs). Implementation of the hardware state machine so as to perform the functions described herein will be apparent to persons skilled in the relevant art(s). In yet another variation, aspects of the invention is implemented using a combination of both hardware and software.

Additional advantages and novel features relating to the present invention will become more apparent to those skilled in the art upon examination of the descriptions above or upon learning by practice of aspects of the invention.

What is claimed is:

1. A system for tracking an object, the system comprising:
a wristband comprising at least one slot for retaining a first receiver and at least one button for selectively enabling operation of the first receiver to monitor a distance between the first receiver of the wristband and a first transmitter device attached to a first object distant from a user, the at least one button being disposed on an inner surface of the wristband, the inner surface being a surface facing a wrist of the user of the wristband, the wristband being in a form of a single, close-ended, ring-like shaped band such that a hand of the user slips through the wristband for wearing and the wristband being further comprising a part to host or accommodate a universal serial bus (USB) connection for communication with a programming component, wherein:
the first receiver of the wristband and the first transmitter device each are configured to receive an assigned unique identification code for communication purposes, and
the first receiver of the wristband is further configured to wirelessly receive a signal generated by the first transmitter device attached to the first object distant from the user for tracking, and to generate an alert signal when the distance between the first transmitter device and the first receiver of the wristband is determined to be greater than a predetermined value,
wherein a plurality of holes disposed on a bottom edge of the wristband to program the wristband.

2. The system of claim 1, wherein:
the signal generated by the first transmitter device has a variable signal strength associated with the distance between the first transmitter device and the first receiver of the wristband,
the predetermined value is associated with a corresponding signal strength, and
the alert signal is generated when the variable signal strength falls below the corresponding signal strength for the predetermined value.

3. The system of claim 1, wherein the first receiver of the wristband and the first transmitter device is capable of receiving a user input code.

4. The system of claim 1, wherein the unique identification code is transmitted to the first transmitter device and to the first receiver of the wristband via the USB connection.

5. The system of claim 1, wherein the processing device is configured to remove the unique identification code from a list of available identification codes after assigning the unique identification code to the first transmitter device and the first receiver of the wristband.

6. The system claim 1, wherein the first receiver of the wristband is configured to communicate only with the first transmitter device having the unique identification code.

7. The system of claim 1, wherein the predetermined value is set to a number in a range of 1 to 5 feet when the at least one button is actuated.

8. The system of claim 1, wherein the predetermined value is set to a number in a range of 100 to 200 feet when the at least one button is actuated.

9. The system of claim 1, further comprising:
wherein the wristband further includes a second receiver capable of receiving programming instructions from the processing device via the USB; and
wherein:
the USB connection is configured to facilitate communication between the processing device and the second receiver of the wristband and a second transmitter device attached to a second object for tracking purposes,
the wristband further comprises at least one additional slot for retaining the second receiver,
the second receiver of the wristband and the second transmitter device are configured to receive a second unique identifier code,
the second transmitter device is configured to generate a second signal,
the second receiver of the wristband is configured to receive the second signal generated by the second transmitter device, and
the second receiver of the wristband is configured to generate an alert signal when a distance between the second transmitter device and the second receiver of the wristband is greater than a second predetermined value based on the received second signal from the second transmitter device.

10. The system of claim 1, wherein a surface of the first transmitter device comprises an adhesive to enable securing of the first transmitter device to the first object.

11. The system of claim 1, wherein the at least one button is disposed within a recessed channel of the wristband.

12. The system of claim 1, further comprising a stylus element for actuating the at least one button by inserting the stylus element into the recessed channel.

13. The system of claim 1, wherein the signal generated by the first transmitter device includes global positioning information.

14. The system of claim 1, wherein the programming of the wristband based on the plurality of holes includes programming the wristband for a home mode, an alert mode, and a normal mode.

* * * * *